W. ULRICH.
Running-Gear for Wagons.

No. 200,952.   Patented March 5, 1878.

WITNESSES:
C. Neveux
C. Sedgwick

INVENTOR:
W. Ulrich
BY Munn & Co
ATTORNEYS.

N. PETERS, PHOTO-LITHOGRAPHER, WASHINGTON, D. C.

UNITED STATES PATENT OFFICE.

WILLIAM ULRICH, OF MADISON, NEW JERSEY.

IMPROVEMENT IN RUNNING-GEARS FOR WAGONS.

Specification forming part of Letters Patent No. 200,952, dated March 5, 1878; application filed January 7, 1878.

*To all whom it may concern:*

Figure 1:
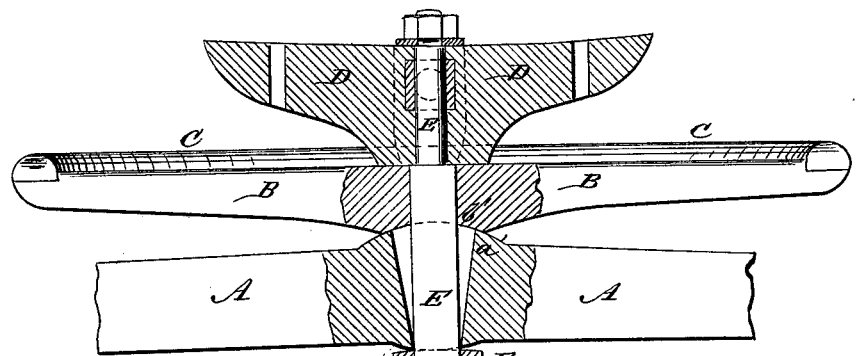
Figure 4:
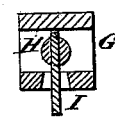
Figure 2:
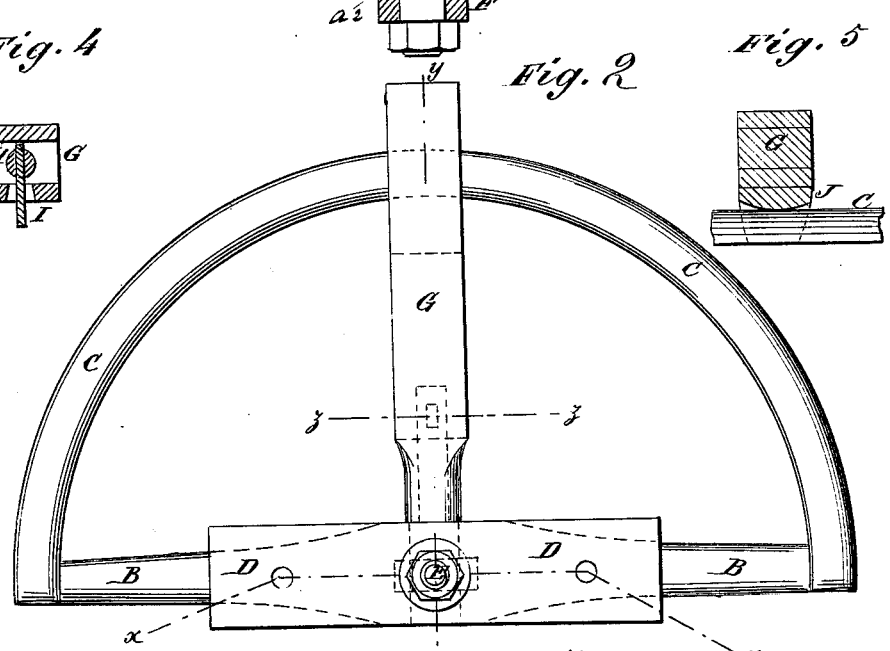
Figure 5:
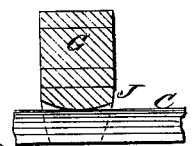
Figure 3:
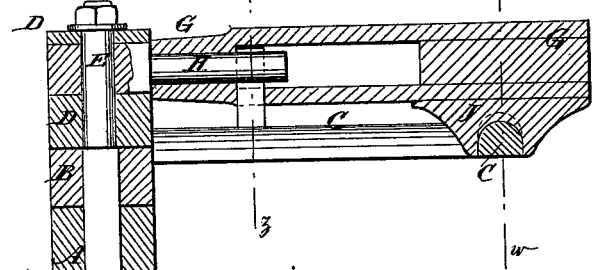

Be it known that I, WILLIAM ULRICH, of Madison, county of Morris, State of New Jersey, have invented a new and useful Improvement in Running-Gear for Wagons, of which the following is a specification:

Figure 1 is a front view of the forward part of the running-gear of a wagon to which my improvement has been applied, partly in section, through the line *x x*, Fig. 2. Fig. 2 is a top view of the same. Fig. 3 is a vertical longitudinal section of the same, taken through the line *y y*, Fig. 2. Fig. 4 is a detail cross-section of the same, taken through the line *z z*, Figs. 2 and 3. Fig. 5 is a detail section, taken through the line *w w*, Fig. 3.

Similar letters of reference indicate corresponding parts.

The object of this invention is to furnish wagon-gearings which shall be so constructed as to prevent the gearing or the springs from being twisted or strained should one of the wheels pass over an obstruction or into a depression.

The invention consists in the axle having rounded projections formed upon its upper and lower sides, and a V-shaped slot formed through it, in combination with the concaved cross-bar of the fifth-wheel, upon which the head-block rests, and with the square lower part of the king-bolt.

A represents the forward axle, upon the upper side of the middle part of which is formed a rounded projection, $a^1$, upon which rests and fits a concavity, $b'$, formed in the lower side of the middle part of the cross-bar B of the fifth-wheel C. Upon the upper side of the cross-bar B rests the head-block D, to which the springs are secured.

The axle A, the cross-bar B of the fifth-wheel C, and the head-block D are connected by the king-bolt E. The upper part of the king-bolt E, that passes through the head-block D, is made round, so that it may turn freely in said head-block. The part of the bolt E that passes through the cross-bar B is made square, and may be rigidly attached to the said cross-bar. The part of the bolt E that passes through the axle A is also made square, and passes through a V-shaped slot in the said axle.

By this construction, should one of the fore wheels rise in passing over an obstruction, or drop into a depression, the axle A will tilt longitudinally upon the cross-bar B, and will thus prevent the gearing and the springs from being strained or twisted, or being turned out of a horizontal position.

Upon the lower side of the center of the axle A is formed a rounded projection, $a^2$, against which rests the rounded upper surface of the washer F. The washer F is secured in place by a nut screwed upon the lower end of the bolt E.

G is the reach, the rear end of which is attached to the rear axle in the usual way, and the forward end of which has a longitudinal hole formed in it to receive the pin or bolt H, the forward end of which is rigidly attached to the head-block D.

The reach G is secured in place upon the pin or bolt H by a key, I, which passes in through a hole in the lower side of the reach G, which hole is made wider than the key I, so that the said reach may turn upon the bolt H, to prevent the gearing from being strained or twisted when one of the rear wheels passes over an obstruction or into a depression.

Upon the lower side of the reach G is formed, or to it is attached, a projection, J, which is notched upon its lower side to receive rest and rock upon the fifth-wheel C.

Having thus fully described my invention, I claim as new and desire to secure by Letters Patent—

The axle A, having rounded projections $a^1$ $a^2$ formed upon its upper and lower sides, and a V-shaped slot formed through it, in combination with the concaved cross-bar B of the fifth-wheel C, upon which the head-block D rests, and with the square lower part of the king-bolt E, substantially as herein shown and described.

WILLIAM ULRICH.

Witnesses:
 JAMES T. GRAHAM,
 C. SEDGWICK.